Nov. 25, 1958  R. E. RICHARDSON  2,861,396
GLASS BENDING MOULDS

Filed June 18, 1956  3 Sheets-Sheet 1

INVENTOR:
RONALD E. RICHARDSON
By Cushman, Darby & Cushman
ATTORNEYS

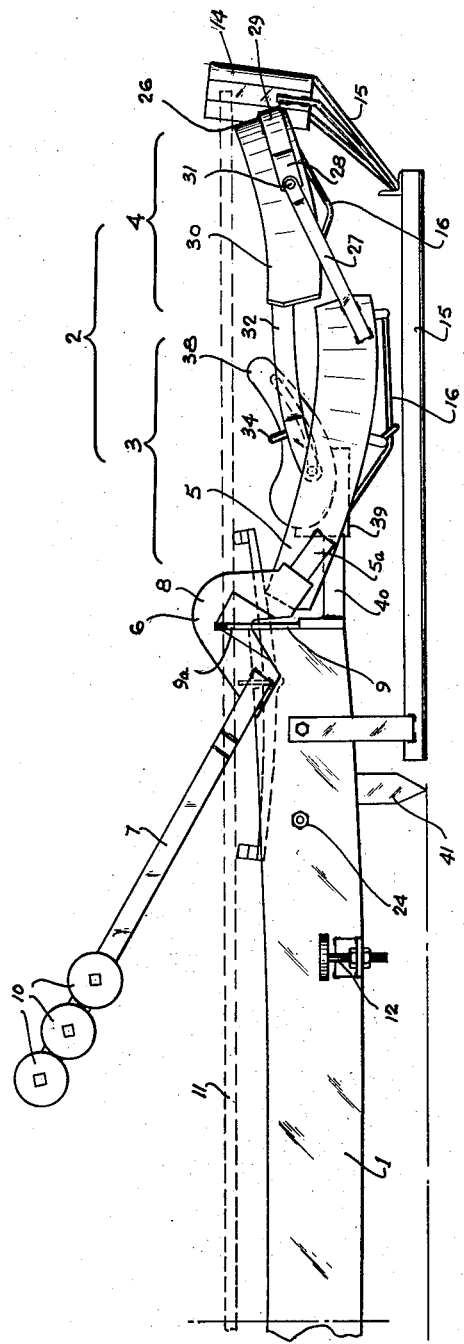

Nov. 25, 1958 R. E. RICHARDSON 2,861,396
GLASS BENDING MOULDS
Filed June 18, 1956 3 Sheets-Sheet 3
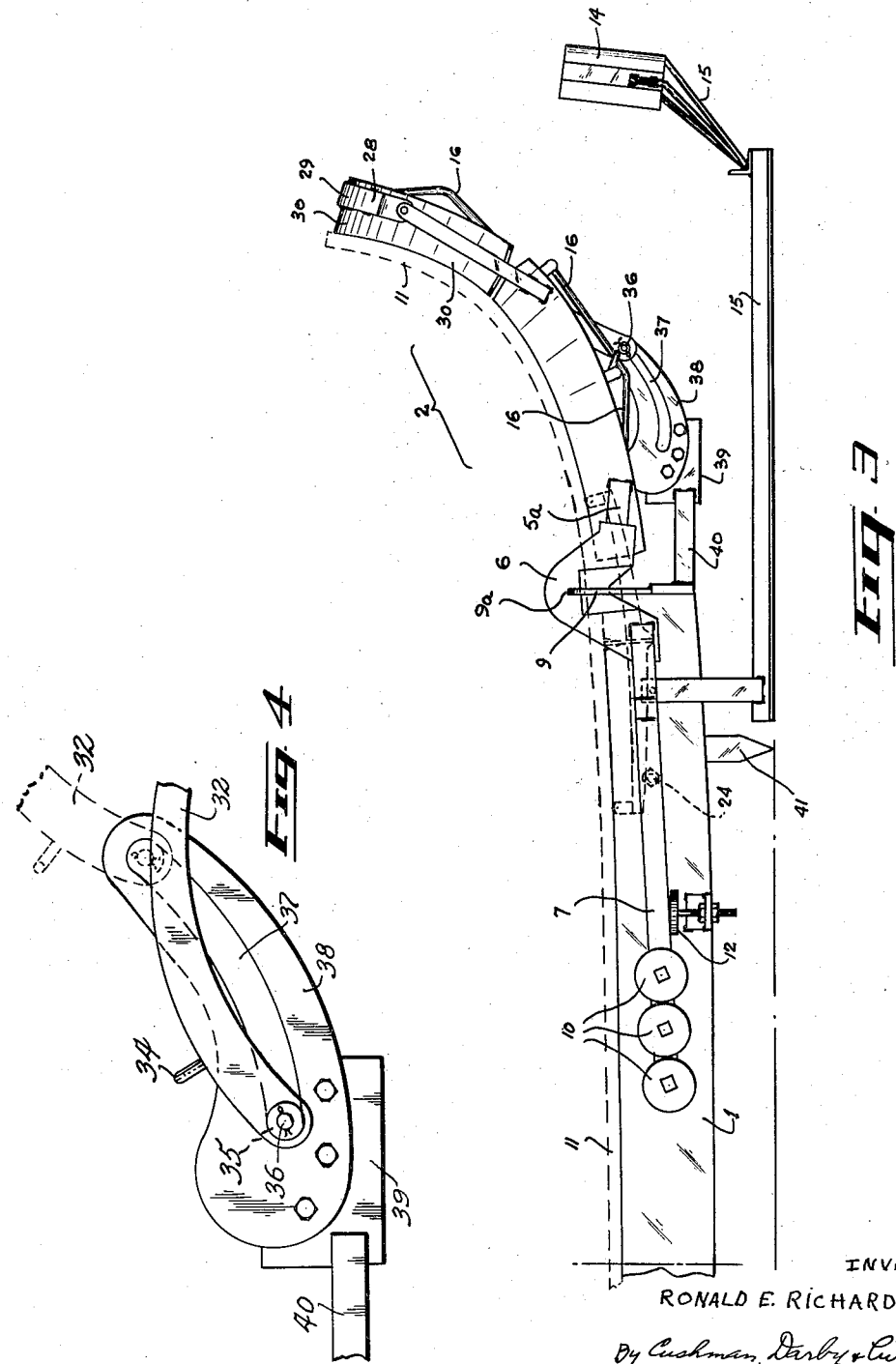
INVENTOR:
RONALD E. RICHARDSON
By Cushman, Darby & Cushman
ATTORNEYS United States Patent Office 2,861,396
Patented Nov. 25, 1958

2,861,396

GLASS BENDING MOULDS

Ronald E. Richardson, Oshawa, Ontario, Canada, assignor to Pittsburgh Plate Glass Company, Pittsburgh, Pa.

Application June 18, 1956, Serial No. 591,913

Claims priority, application Canada July 2, 1955

4 Claims. (Cl. 49—67)

This invention relates to improvements in the construction of moulds such as are employed in the bending of elongated glass sheets to curved form. The advent of "wrap-around" windshields in automobile design has given rise to the need for efficient moulds for the initial processing of the elongated glass sheets that will ultimately form the laminated safety glass of such "wrap-around" windshields. A "wrap-around" windshield consists of an elongated sheet of laminated glass of gentle curvature at its centre, the radius of curvature decreasing sharply at each end until the glass is extending almost perpendicular to the main body of the glass.

The technique employed in forming such "wrap-around" windshields, or like objects of curved laminated glass for automobile windows or other applications, is to lay a pair of flat elongated glass sheets on a mould which is so arranged as to tend to take up its final configuration when so permitted by the softening of the glass. The mould and glass sheets are passed through a furnace in which the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed in manufacturing the tempered type of non-laminated safety glass.

The present invention is concerned with the construction of moulds for the preliminary bending of one or more such sheets during passage through a furnace.

It has become the practice to form moulds for this purpose with pivoted end portions each of which either can be swung into a first position (when the flat, cold glass is originally placed in position thereon—subsequently referred to as the "flat" position of the mould), or can move into a second position (the "curved" position of the mould) as the resistance to bending of the glass decreases on exposure to higher temperatures. Weights tending to urge the movable portions of the mould into such latter position are normally provided.

The present invention is directed towards providing an improved construction of pivoted end mould portion for use in such glass bending moulds.

It has already been proposed to employ a sectionalized end mould portion, namely an end portion that itself consists of two relatively movable sections. Sectionalization of the end mould portion facilitates more precise control over the positions of the various elements of the mould throughout the whole of the bending operation.

It is an object of the present invention to provide an improved construction of such a sectionalized end mould portion, in which the forces exerted on the glass are distributed in a manner more conducive to accurate, smooth and gentle bending of the glass.

Although sectionalized moulds have previously been proposed, no method satisfactory in practice has yet been evolved for maintaining control over the movements of the parts in a simple but reliable manner, when the end of the glass is to be bent other than as a simple cylindrical bend. To manufacture a wrap-around windshield it is necessary to impose a conical bend in the glass at its ends.

The present invention, the aim of which is the amelioration of these problems, consists of a glass bending mould comprising a main mould portion and an end mould portion pivotable relatively to said main mould portion between a "flat" position and a curved position, said end mould portion itself comprising a first section pivotally mounted on said main mould portion and a second section pivotally mounted on said first section, and co-operating parts on said main mould portion and said second section of the end mould portion effective on pivotal movement of said first section relatively to said main mould portion to cause simultaneous predetermined movement of said second section relatively to said first section, said co-operating parts comprising a cam in the form of a slotted plate mounted substantially centrally of the lateral edges of the mould, and a cam follower engaged therewith. A cam is the most convenient mechanism for controlling a motion of this type because of its infinite possibilities of shape variation.

Glass bending moulds normally fall into one of two classes—concave or convex moulds—depending on whether the glass is cradled within a concavely curved mould or wrapped around a convexly curved one. The present invention is directed towards a construction of mould primarily applicable to the concave type of mould and for this reason the invention will be exemplified below with reference to a concave mould. The basic essentials of the present invention are, however, equally applicable to a convex mould as will become apparent from the subsequent description.

One half of a concave skeleton mould embodying the invention is illustrated by way of example in the accompanying drawings. The other half of the mould is identical in mirror image, and has thus not been illustrated.

Figure 2 is a side view of the mould half seen in Figure 1, with the parts in the same position;

Figure 3 is a view similar to Figure 2 but with the parts in the curved (in this type of mould, "concave") position assumed after bending of the glass; and Figure 4 is an enlarged fragmentary view of a cam mechanism incorporated in the mould seen in the foregoing figures.

Figure 1:
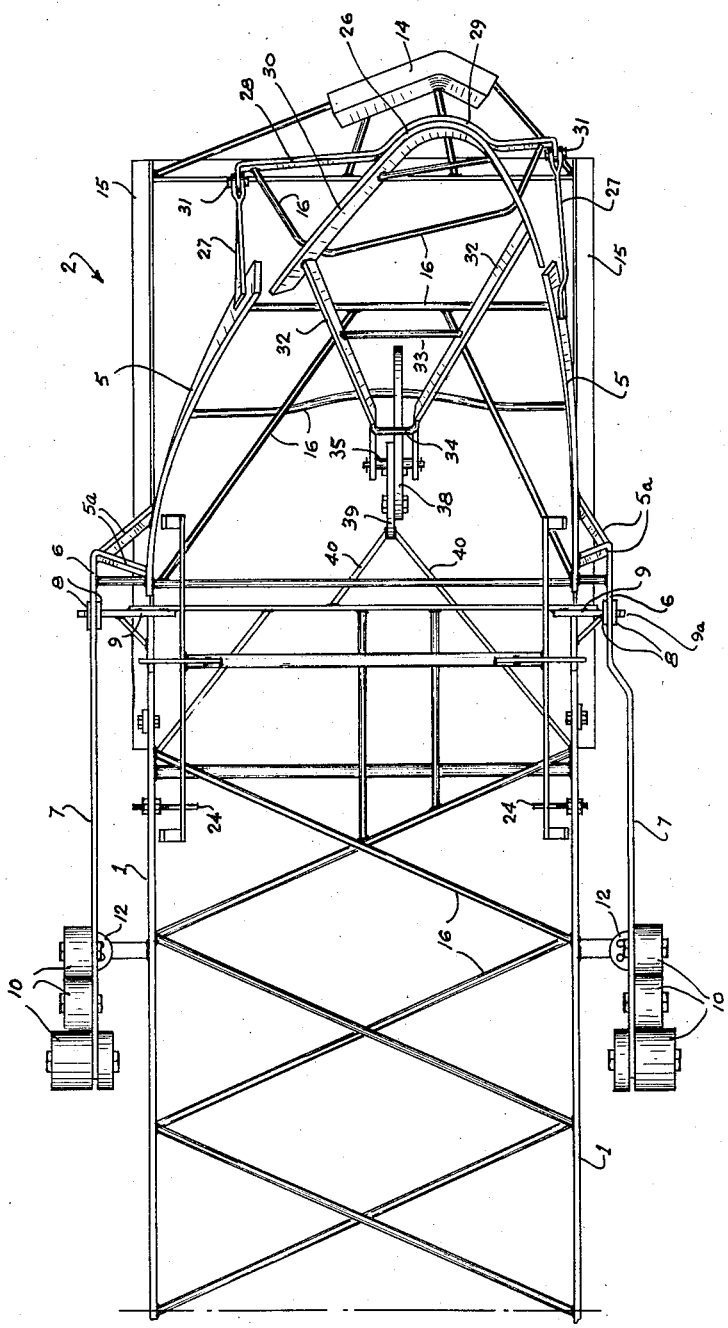
Figure 1 shows a plan view of the mould half in the initial "flat" position of the parts prior to bending of the glass.

The main side bars of the mould are each designated by the reference numeral 1, the movable end portion at the end of the mould visible in the drawings being shown generally at 2. This movable end portion 2 is itself composed of two relatively movable mould sections 3 and 4 and the present inventive advance is concerned with the structure and operation of these mould sections 3 and 4 and their ancillary parts.

In order, however, to indicate the spatial and functional relationship of these sections to the remainder of the mould, the drawings also illustrate other parts of the mould which are either common to the prior art or form the subject matter of one or other of two co-pending United States applications Serial Nos. 592,111 and 592,194, both filed June 18, 1956. Before proceeding with a detailed description of the features of the mould with which the present invention is concerned, a short description of the other parts of the mould will therefore be necessary.

The mould section 3 includes a pair of side bars 5 each secured by suitable struts 5a to an arched bracket 6 to which there is further secured an arm 7 extending generally away from the end portion 2 and, when the parts are in the "flat" position of Figures 1 and 2, upwardly at an angle approximately equal to that through which it is desired to pivot the end portion 2. Each of the brackets 6 carries a pair of reinforcing side plates 8 secured to each side surface of such bracket. The two brackets 6 serve to mount the movable end portion 2 on a pair of vertical plates 9 terminating in upwardly projecting fingers 9a and each secured to an end of one of the main side bars 1. A set of weights 10 is secured to the free end of each of the arms 7 and has the effect of tending to rotate the end portion 2 in an anti-clockwise direction from the "flat" position seen in Figure 2 to the concave position seen in Figure 3. As will appear from the latter figure, in the fully rotated position the arms 7 come to rest each against an adjustable stop 12, the position of which thus determines the limit of anti-clockwise rotation of the end portion 2. As best seen from Figure 1, the arms 7 are disposed outwardly of the side bars 1 in order to be free to move downwardly without encountering the glass sheet which overlaps the edges of the bars 1 by a small amount.

Normally, in practice, when the mould is being employed as a step in the manufacture of laminated windshields, two sheets of glass, one on top of the other, will be laid on the mould so as to be bent simultaneously and thus always match one another perfectly. This pair of glass sheets is shown diagrammatically by the broken lines 11 in Figures 2 and 3.

Turning now to consideration of the aspects of the mould that form the subject of the present invention, it will be seen that each of the side bars 5 of the mould section 3 carries at its end remote from the side bars 1 a projecting rigid arm 27 the end of which is formed as a fork to provide pivotal support for a cross-arm 28. The centre portion 29 of the cross-arm 28 is curved outwardly to embrace and support the extreme end of a bar 30 which is bent into a V-shape to form the glass supporting edge of the mould section 4. The cross-arm 28 is connected to the two forked ends of the arms 27 by pins 31 to allow relative rotation between the mould sections 3 and 4, as will be apparent from a comparison of Figures 2 and 3.

From the bent bar 30 of the mould section 4 there projects, towards the mould section 3, a pair of rigid struts 32 secured together by cross ties 33 and 34 and brought together at their ends to form a mounting for a stainless steel roller 35 freely rotatably mounted on a pin 36 extending between such struts 32. This roller 35, which acts as a cam follower, is engaged in a curved slot 37 of a cam plate 38 that is rigidly secured to the main mould portion by a plate 39 and struts 40. The detailed structure of this cam mechanism is shown on an enlarged scale in Figure 4.

When the mould is to be used, the glass sheets 11 are laid on top of the mould, which will thus be in the "flat" position seen in Figures 1 and 2, the parts of the cam mechanism being in the full line position seen in Figure 4. The weight and rigidity of the glass 11 will initially prevent upward movement of the end portions 2 of the mould, the tip 26 of each mould section 4 being held down by the underside of the glass 11 against the force exerted by the weights 10. This condition remains until the glass begins to soften as a result of increasing temperatures that it encounters on being fed on a continuously moving belt through an oven. Gradually the upward bending force exerted by the weights 10 will take charge and the glass will allow each of the end portions 2 to swing slowly and uniformly upwards. Finally the arms 7 will come to rest on the stops 12 and the parts will then be in the position illustrated in Figure 3 and in broken lines in Figure 4, the glass 11 being smoothly bent to the required shape. During this operation, the mould section 4 is subjected to two pivotal movements.

Firstly it rotates as a whole with the end mould portion 2 about the axis defined by the plates 9; and secondly, it rotates relatively to the mould section 3 about the pins 31 while the mould section 3 itself rotates about the axis defined by the plates 9. The effect of the independent rotation of the mould part 4 relatively to the mould section 3 is somewhat to delay bending of the extreme end section of the glass 11. In this manner it is practical to preselect any program of rotation or bending cycle of the extremity of the glass and thus choose the program most suited to the conditions. Moreover, it is a simple matter to fit a different cam and change the program.

The exact rate of pivotal movement of the mould section 4 about the pins 31 is determined by the shape of the slot 37 in the cam plate 38, and it is a simple matter to manufacture this slot in any desired shape. It will be appreciated that the cam plate 38 is not secured to the mould section 3 but to the main portion of the mould constituted primarily by the side bars 1. Although it has previously been proposed to employ multi-hinged moulds using linkages between counterweight arms and the various mould sections, no satisfactory method of relating the movements of the sections of the mould has hitherto been developed. The present expedient of employing a cam plate secured centrally to the end of the main portion of the mould, with the relative movement of the end sections related to the counterweight arms only insofar as the latter determine the movement of the mould section 3 on which the mould section 4 is mounted, has provided a very satisfactory method of controlling movement of a separate portion at the extreme end of the mould. It has been found possible with the present construction to maintain the friction between the parts low and uniform.

It will be appreciated that the present disposition could be reversed in that the cam plate could be mounted on the mould section 4 to co-operate with a stationary roller secured to the main mould portion.

It should be noted that the single cam used is approximately centrally located from side to side of the mould. This location assures a symmetrical distribution of cam restraining forces through each end pivot which does not distort the mould and permits the cam to program the tip movement with relatively little friction.

Delay in bending of the extreme tip of the glass 11 is also contributed to by a thermal ballast device 14 consisting of a comparatively massive block of metal stationarily mounted on supporting members 15 so as to lie outwardly of, but close to the outward end of the mould section 4 and the extreme end of the glass that rests on the tip 26 of such mould section 4, in the "flat" position of the mould. This ballast device 14 has an appreciable cooling effect on the portions of the mould section 4 and the glass 11 adjacent to it, so that, as the glass passes through the oven, its extreme ends tend to lag behind the remainder of the glass in temperature rise. This has the effect of causing the glass to start to bend at the waist, i. e. at the part above the line of junction of the main portion of the mould and the end portion 2 of the mould, this being the part of the glass to which additional support is furnished by the lugs 22 of the teeter 13. As soon as the end portion 2 of the mould starts to move upwardly as the glass bends at the waist, the end of the mould section 4 moves away from the ballast device 14 so that the cooling effect of the thermal capacity of the latter is no longer felt. As the temperature of the glass at its extreme end continues to rise and the glass thus to soften, the continued anti-clockwise rotation of the mould sections 3 and 4 acts smoothly and gently to bend the glass into the curved contour seen in Figure 3, in which position the bars 1, 5 and 30 of the various portions of the mould form a single, continuous, smoothly curved, glass-supporting mould edge.

It will be noted from Figure 3 that the main body of the glass also sags sufficiently to bring its edge into contact with the full length of the side bars 1. The degree and area of application of heat, combined with the comparatively narrow transverse dimension of the mould normally permit no significant transverse sagging of the glass, although transverse sagging can be provided for if desired.

The remaining parts of the mould visible in the drawings are conventional supporting legs 41 and conventional bracing members 16 extending between the side bars 1 and between the parts of the end portion 2. Certain of these bracing members 16 that connect the parts of the mould sections 3 and 4 project somewhat downwardly from the bars 5 and the bar 30 in order to reduce the mass of metal closely adjacent the glass sheet and thus minimize local cooling effects thereon.

I claim:

1. A glass bending mould comprising a main mould portion; an end mould portion pivotable relatively to said main mould portion between a "flat" position and a "curved" position, said end mould portion itself comprising a first section pivotally mounted on said main mould portion and a second section pivotally mounted on said first section; and cooperating parts on said main mould portion and said second section of the end mould portion effective on pivotal movement of said first section relatively to said main mould portion to cause simultaneous predetermined movement of said second section relatively to said first section, said cooperating parts comprising a cam in the form of a slotted plate mounted substantially centrally of the lateral edges of the mould, and a cam follower engaged therewith.

2. A glass bending mould of the concave type comprising a main mould portion; an end mould portion pivotable relatively to said main mould portion between a "flat" position and a "concave" position, said end mould portion itself comprising a first section pivotally mounted on said main mould portion and a second section pivotally mounted on said first section; a cam secured to said main mould portion generally centrally of said first section; and a cam follower mounted on said second section and held in engagement with said cam whereby on pivotal movement of said first section relatively to said main mould portion to effect simultaneous predetermined pivotal movement of said second section relatively to said first section.

3. A glass bending mold comprising a main mold portion, an end mold portion pivotable relative to the main mold portion between a "flat" position and a "curved" position, said end mold portion itself comprising a first section pivotally mounted on said main mold portion and a second section pivotally mounted on said first section, and interengaged cooperating parts comprising a cam and a cam follower, one of said cooperating parts being attached to said main mold portion and the other of said cooperating parts being attached to said second section of the end mold portion, whereby, on pivotal movement of said first section relative to said main mold portion the cooperating parts cause simultaneous predetermined movement of said second section relative to said first section.

4. The mold according to claim 3 wherein the cam is fixed to the main mold portion and the cam follower is fixed to said second section.

References Cited in the file of this patent

UNITED STATES PATENTS

| 2,729,032 | White | Jan. 3, 1956 |
| 2,774,189 | Jendrisak | Dec. 18, 1956 |

FOREIGN PATENTS

| 710,393 | Great Britain | June 9, 1954 |